United States Patent [19]

Hensel et al.

[11] 4,171,868
[45] Oct. 23, 1979

[54] OPTICAL FIBER CABLE

[75] Inventors: Paul C. Hensel; John H. Stewart, both of Woodridge, England

[73] Assignee: The Post Office, London, England

[21] Appl. No.: 817,793

[22] Filed: Jul. 21, 1977

[30] Foreign Application Priority Data

Jun. 8, 1976 [GB] United Kingdom .............. 32907/76

[51] Int. Cl.² .................................................. G02B 5/14
[52] U.S. Cl. .................................................. 350/96.23
[58] Field of Search ...................... 350/96.23, 96.26; 174/28, 29, 69, 70 R; 264/290 R, 290 N

[56] References Cited

U.S. PATENT DOCUMENTS

| 2,536,904 | 1/1951 | Beuckens et al. ...................... 174/29 |
| 3,357,423 | 12/1967 | Winchester et al. ............... 350/96.26 |
| 3,691,001 | 9/1972 | Takahashi et al. ................. 350/96.26 |
| 3,699,950 | 10/1972 | Humphrey, Jr. et al. ......... 350/96.26 |
| 3,962,153 | 6/1976 | Gore ................................... 264/290 R |
| 3,982,060 | 9/1976 | Avery et al. ....................... 350/96.20 |
| 4,093,342 | 6/1978 | Foord et al. ....................... 350/96.23 |

FOREIGN PATENT DOCUMENTS 2546737  4/1977  Fed. Rep. of Germany ........ 350/96.23

*Primary Examiner*—Stewart J. Levy
*Attorney, Agent, or Firm*—Kemon and Estabrook

[57] ABSTRACT

A communications cable comprises a single optical fibre enclosed in a sheathing assembly which protects the fibre against shock and bending. The sheathing assembly comprises end members and a protective sheath surrounded preferably by a coiled spring.

4 Claims, 3 Drawing Figures

OPTICAL FIBER CABLE

This invention relates to improvements in cables comprising an operative core and a protective outer sheath.

The invention finds particular application in cables for transmitting optical signals. In such cables the core is a glass or quartz fibre which is both thin and delicate. Such fibres will hereinafter be referred to as 'optical fibres'.

The present invention has for its objectives the provision of an improved sheathing assembly for protecting a single optical fibre and an improved cable incorporating the sheathed fibre. The assembly is to find special application in terminations wherein a single optical fibre runs from a multiple cable to a point of use.

According to the present invention there is provided a sheathing assembly for a length of delicate material such as a single optical fibre, such assembly comprising end members and a protective sheath extending between, and fixed to, the end members, the sheath being capable of resisting longitudinal stress and of protecting the core against lateral shock and excessive bending. In use the length of delicate material is received, usually with a substantially radial clearance, within the sheath. Thus the material is protected but free for longitudinal movement within the sheath.

A preferred sheathing assembly comprises a coiled spring surrounding with radial clearance a sheath of polymeric plastics material having the molecules thereof oriented longitudinally thereby providing the resistance to longitudinal stress. The spring provides the protection against lateral shocks and excessive bending. The optical fibre extends with radial clearance within the sheath.

Each end member is conveniently constituted by a substantially rigid ferrule. The ferrule may be adapted for connection to, or form part of, a coupling device for connecting an optical fibre to an adjacent fibre.

The invention further provides an optical communications cable comprising a single optical fibre incorporated in the sheathing assembly described above.

The invention will now be described by way of example and with reference to the accompanying drawings wherein.

Figure 1:
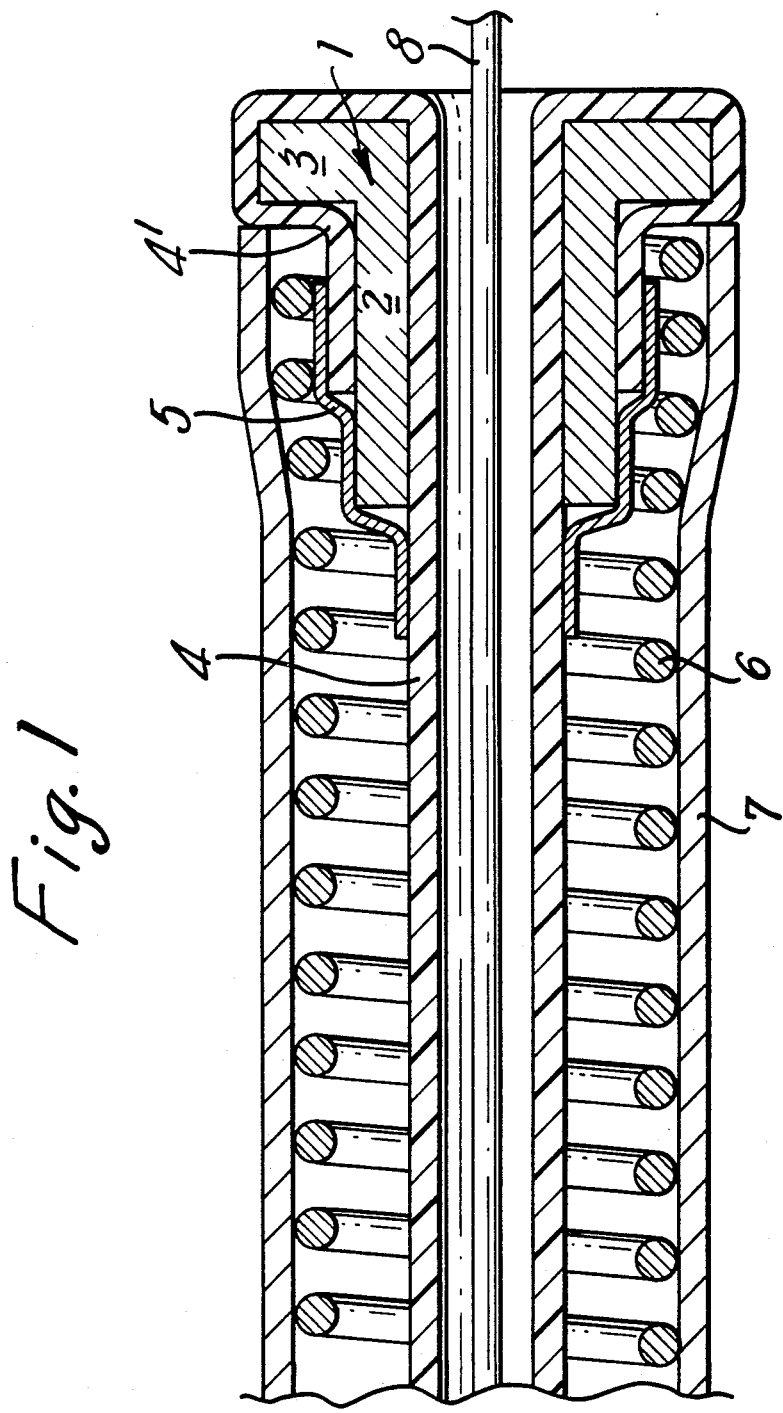
FIG. 1 is a longitudinal section of an end part of a communications cable in accordance with a particular embodiment of the invention.

Referring now to FIG. 1 of the drawings, the sheathing assembly illustrated comprises end ferrules 1, formed of a substantially rigid material such as copper, brass or resin-bonded fibres. Each ferrule 1 comprises a cylindrical inner part 2 and a radially outwardly extending annular flange 3. A polymeric plastics sleeve 4 having longitudinally orientated polymer molecules for example a polypropylene sleeve has the outer surface thereof engaged by the radially inner surface of ferrule 1 and the end part thereof split and turned back as a fixing part 4' to embrace the radially outer surface of the ferrule 1. A short sleeve of heat shrinkable tubing 5 surrounds and grips the cylindrical part 2 of the ferrule 1 trapping and securing the turned back end part 4' of sleeve 4. A loosely coiled spring 6 coaxially surrounds with substantial radial clearance the cylindrical part of the ferrule 1, and the sleeve 4. The end part of spring 6 is secured in position over the sleeve 4 on ferrule 1 by an elongate heat shrunk tube 7 running the length of the cable.

Within the sleeve 4 is fitted with substantial radial clearance an optical fibre 8.

Several sections of this cable were tested and it was found that a longitudinal pull of 5 kg failed to break the fibre 8 whilst a crushing force of 50 kg applied to the cable over a length of 5 mm deformed the cable but did not damage the fibre. The fibre also survived the sharpest bends which the cable would permit (about 10 mm diameter).

Figure 2:
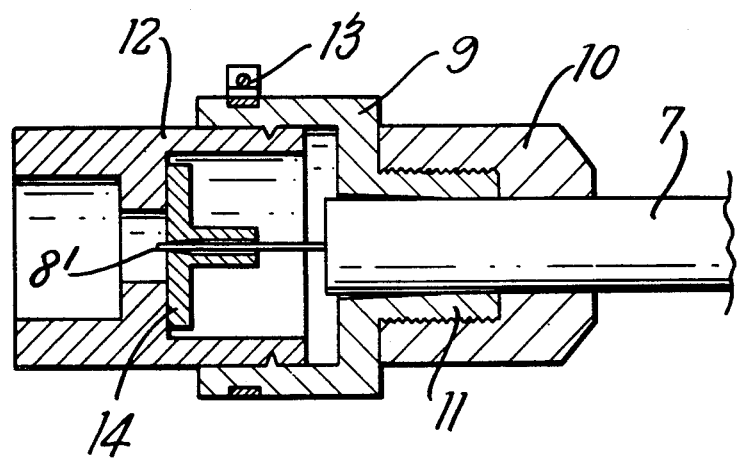
FIG. 2 is a view on a slightly reduced scale similar to FIG. 1 showing a coupling arrangement for one end of a cable such as shown in FIG. 1.
Figure 3:
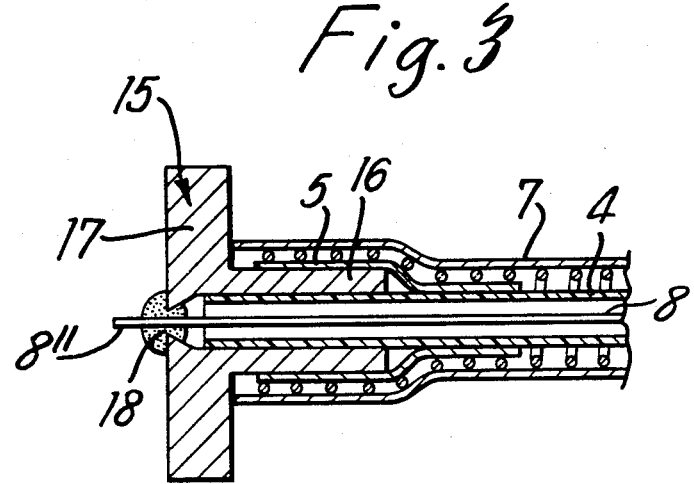
FIG. 3 is a view, similar to FIG. 2, showing an alternative coupling arrangement.

FIGS. 2 and 3 of the drawings illustrate how the optical fibre may be incorporated in couplers either to an adjacent fibre or to a repeater.

In the embodiment shown with reference to FIG. 2 a collet 9 surrounds the outer tube 7 and is locked thereon in gripping relationship by a nut 10 engaging threaded collet extension 11. The collet 9 engages a suitable lens coupler end piece 12 and is locked thereon by ring 13. The optical fibre extends to and is secured by a mounting plate 14, the end part of the optical fibre protruding at 8' for coupling. In the alternative coupling arrangement shown in FIG. 3 one of the end ferrules is replaced by a modified ferrule 15 which constitutes the coupling plate. This ferrule comprises a cylindrical part 16 onto which the various components of the cable are secured as previously described and a radially outwardly extending flange 17. The fibre end part 8" emerges from a central opening 18 and is secured by an appropriate adhesive for example a cyanoacrylate.

In the above described embodiment the optical fibre 8 is approximately 125 micrometers in diameter, the sleeve 4 is approximately 700 micrometers in diameter and the steel spring is approximately 3 mm in diameter.

We claim:

1. An optical communications cable comprising:
   a single optical fiber;
   an annular sleeve of polymeric plastics material surrounding said fiber with radial clearance of the order of twice the fiber diameter, said sleeve having the molecules thereof orientated longitudinally;
   a rigid ferrule at each end of said sleeve, said sleeve being inserted into said ferrule;
   means fixing said sleeve to said ferrule;
   a coil spring surrounding said sleeve with radial clearance of the order of twice the sleeve diameter, said spring protecting the fiber against lateral shock and excessive bending and said sleeve and ferrules providing the resistance to longitudinal stress; and
   an outer tube surrounding said spring.

2. A communications cable as claimed in claim 1 wherein each ferrule has a radially outwardly extended annular flange and wherein said sleeve extends out of said ferrule and is turned back over the flange and onto the outer surface of said ferrule and wherein the means fixing said sleeve to said ferrule is a further sleeve tightly fitting over said sleeve and the turned back part thereof on the ferrule.

3. An optical communications cable as claimed in claim 1 in which said ferrule constitutes a part of a coupling device for connecting said optical fibre to an adjacent optical fibre.

4. An optical communications cable as claimed in claim 1 wherein said outer tube is shrunk onto the outer surface of the spring.

* * * * *